Sept. 7, 1937.                L. E. SWEDLUND                2,092,096
AMPLIFIER CIRCUIT
Filed Aug. 15, 1935
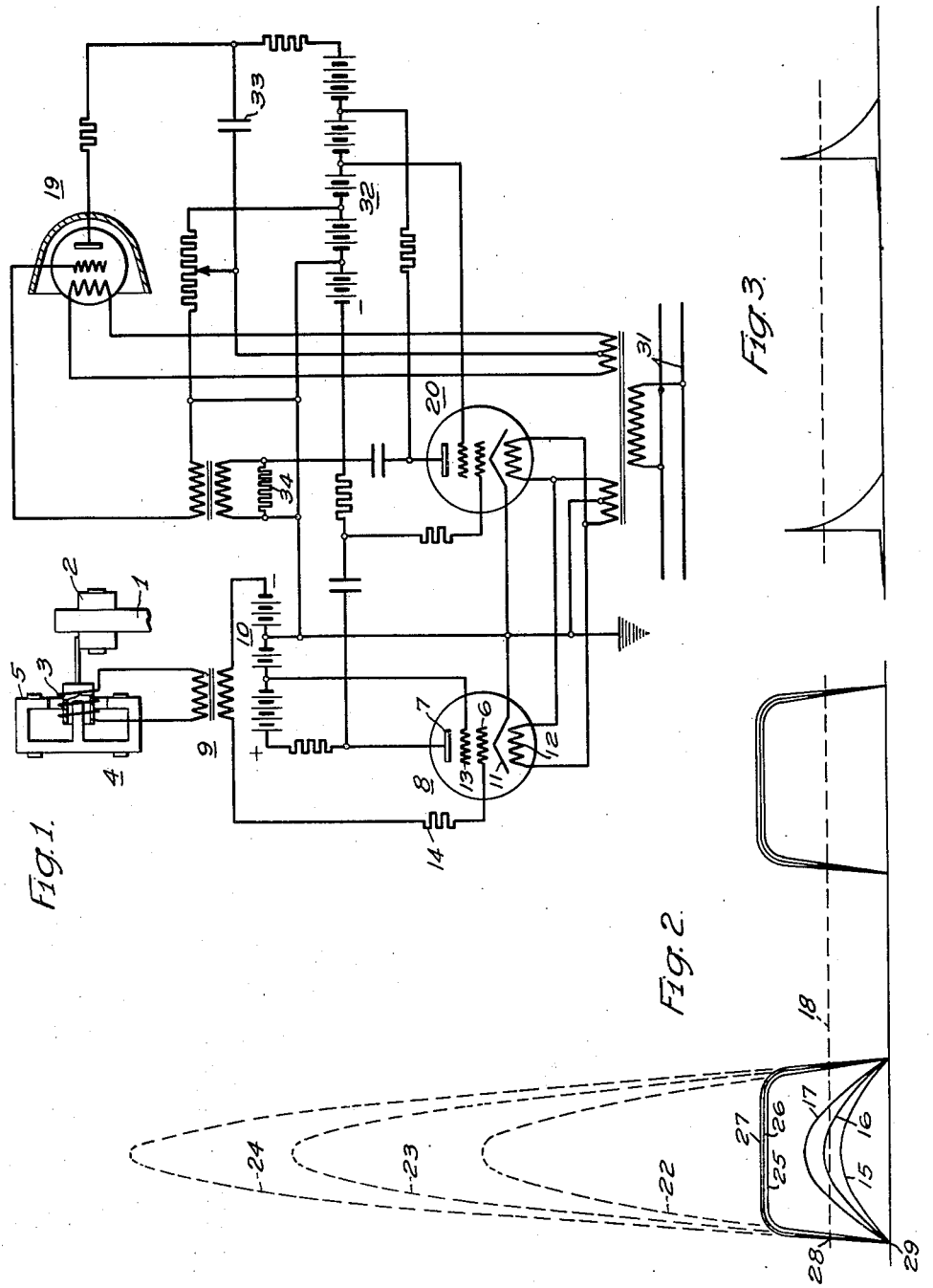
WITNESSES:
INVENTOR
Lloyd E. Swedlund.
BY
Paul E. Friedemann
ATTORNEY Patented Sept. 7, 1937

2,092,096

UNITED STATES PATENT OFFICE 2,092,096

AMPLIFIER CIRCUIT

Lloyd E. Swedlund, Wilkinsburg, Pa., assignor to Westinghouse Electric & Manufacturing Company, East Pittsburgh, Pa., a corporation of Pennsylvania Application August 15, 1935, Serial No. 36,320

10 Claims. (Cl. 176—124)

This invention relates to an amplifier circuit arrangement and more particularly to an amplifier circuit having certain special output characteristics.

It is an object of my invention to cause the discharge of an electric discharge device at a specified point on an alternating-current voltage wave in a circuit of the discharge device.

My amplifier circuit arrangement has general utility but to aid in the disclosure of the circuits, their function, and the novel results attained, my disclosure of the circuits is made with reference to their use in conjunction with a stroboscope.

A stroboglow, or stroboscope, is designed for the study of high-speed rotating or vibrating objects. By means of a stroboscope, objects having arbitrary periodic motions may be made to appear at rest, or may be made to trace their prescribed course in either a forward or backward direction at any desired reduction in speed. If a body, which may be vibrating or rotating, is to appear motionless, a flash of light from a discharge device is periodically thrown upon it. The discharge takes place for such a short interval of time, that is, the light is on for such a short time, and then off again, that the body moves less than .01 inch, and more often less than .001 inch during a single period of illumination. The picture the eye sees during the instant of illumination is retained over the dark period, when nothing would ordinarily be seen, until the object is again illuminated and the same image is impressed on the eye. The result is that the object appears as if it were standing still and being illuminated by a steady source of light.

The above-mentioned case relates to the condition when the frequency of the light flashes is the same as that of the periodic motion, that is, the vibration, or rotations of the body under observation. If the frequency of the flashes is decreased with reference to the periodicity of motion of the body, the object, or body, will appear to be tracing its course in a forward direction, and the speed of such motion will be determined by the difference in frequency between the flashes and the frequency of movement of the body. If the frequency of the flashes is increased with reference to the periodicity of motion of the object or body, the body will appear to be tracing its course in a reverse direction, and the speed of its apparent motion will be determined by the difference in frequency between the flashes and the frequency of movement of the body.

When the frequency of the body is low, the flashing of the discharge device producing the stroboscopic light can be controlled by a switch operated by the moving body, the body under observation. This method of mechanically closing a circuit to initiate the operation of a discharge device has been known in the past to give consistent results at moderate speeds. In some cases, where it is not possible or at all practical to use a contactor or switch, a vacuum tube oscillator has been proposed, by means of which the grid of the glow tube or discharge device is raised to proper potential to cause a breakdown, or discharge, of the discharge device producing the stroboscopic light. With this scheme last mentioned, it is impossible to hold the image perfectly still as slight variations in the speed of the object being observed cause a waver of the image.

In balancing rotors the time of vibration of the rotor in a plane of the axis of rotation is determined by the phase of the unbalance, namely, angular position of the unbalance with reference to a plane passing through the axis of rotation and a line in the face of the rotor parallel to the axis of the rotor. This phase position is of course independent of the speed of the rotor, but the amplitude of the vibration is obviously not independent of speed. The amplitude is primarily a function of the magnitude of unbalance. Different rotors thus have different amplitudes of vibration. To determine the phase position of the unbalance it is essential that means are provided that are unaffected by variations in amplitude of the vibrations.

If, as is the case in the practice of balancing different rotors, the amplitude of vibration is different for different rotors, and a stroboscope is to be used, no satisfactory triggering off of the tube is secured. That the amplitudes vary is obvious from the fact that no two rotors, even of the same type, are apt to present the same condition of unbalance.

One object of my invention, therefore, is to cause a discharge of an electric discharge device to be substantially unaffected by variations in the amplitude of the voltage in a circuit of the discharge device.

Another object of my invention is to cause the breakdown of a discharge device at a time in relation to the voltage wave in a circuit of the device that is substantially unaffected by variations in the frequency of such voltage wave.

A broad object of my invention is to control a discharge device so that its breakdown occurs at a selected time with reference to a certain point or phase angle of an alternating-current voltage wave.

In the art of balancing rotors, such as the rotors for motors operating spinning buckets, coil winding spindles, conductor wrapping heads, rayon fiber producing buckets, etc.; and in the art of balancing such buckets themselves, of balancing turbine shafts, and rotors, and of balancing turbo-generator rotors, the vibrations, at normal speed, are always of a very high frequency and the amplitude varies with different rotors.

In the use of a balance indicator for rotating parts, such as disclosed in the application for Letters Patent of J. G. Baker and F. C. Rushing entitled Indicating balancing machine, Serial No. 46,312, filed October 23, 1935, it is necessary to fire, or trip, that is, initiate the discharge, of an electronic discharge device, which serves as a stroboscopic light source, at a definite part of the alternating current voltage wave generated by electric pick-up units actuated by the rotating member being balanced, independent of the amplitude of such wave over a wide range.

It is thus also an object of my invention to provide for so changing the voltage characteristic of the voltage wave produced by a pick-up unit operated by a rotating member to be balanced that an electric discharge device will be caused to breakdown at a time having a definite relation to a selected point on the alternating-current voltage wave produced by the pick-up unit.

Other objects and advantages of my invention will become readily apparent from a study of the following specification when taken in conjunction with the accompanying drawing, in which:

Figure 1 is a circuit diagram showing the novel features of my invention; and

Figs. 2 and 3 show, respectively, the change in voltage characteristics produced by my system of control.

Referring generally to Fig. 1, the reference character 1 designates the rotor that is to be inspected for the phase position of its unbalance. The amount of unbalance will, of course, determine the magnitude of the vibration of the flexible or movable bearing 2. The bearing 2 is mechanically coupled to the movable coil 3 of a generator 4. The generator 4 may have a stator structure comprising a permanent magnet 5, as shown, or may comprise an electromagnet. The design is, preferably, such that the oscillations of the coil generate a sinusoidal wave of alternating voltage in the coil.

This comparatively small alternating-current voltage is impressed on the grid 6 and anode 7 of the amplifier tube 8 from the secondary winding of the transformer 9 through the source of direct-current voltage represented by the battery 10. It is quite desirable that a very uniform source of direct-current voltage of considerable value be available for my circuit assembly. In practice, a source of alternating current may be rectified and filtered to produce the uniform high-voltage source of direct current.

The tube 8 is of the indirectly heated type and, therefore, has its cathode 11 disposed adjacent the heater element 12. The tube 8 is also provided with an auxiliary grid 13 so connected to the source of direct current as to produce a selected small blocking bias between the cathode 11 and the anode 7. A different type of tube may of course be used. The character of the tube is not the essential part of the invention.

The tube 8 is provided with a resistor 14 of considerable resistance, in the circuit of the grid 6. The utility of this resistor will presently appear. A grid glow tube is essentially a voltage-operated device and normally when voltage positive with respect to its cathode is applied to its anode, suddenly passes current whenever a certain critical grid bias voltage is overcome. Thus if, as in the case of the generator 4 shown, the grid tripping voltage is sinusoidal, the tripping voltage, or critical voltage, is reached sooner in the cycle the higher the amplitude of the wave. Fig. 2 illustrates this.

In Fig. 2 curves 15, 16 and 17, respectively, show the unamplified voltage variations of the generator 4 for three different rotors of the same type. If the line 18 represents the critical potential for the electronic device 19 of the stroboscopic type, as described below, it is apparent that device 19 will not be caused to break down at all by the unbalance of the rotor causing generator 4 to generate the voltage wave 15. For the voltage represented by the curves 16 and 17, the time of the breakdown of device 19 will shift, with reference to a given point on the voltage wave, with variations of the amplitude of the voltage.

The device 19 is an electronic discharge device designed to produce light impulses of very short duration. That is, device 19 is a grid glow device designed to be capable of producing a stroboscopic light.

The tube 8 is an amplifier tube. To overcome the difficulty above pointed out, this tube 8 is connected to amplify the voltage of the generator 4. Tube 20 is simply another tube producing a second stage of amplification. By the use of enough amplifiers, the wave front, namely, the initial portion of the sinusoidal voltage of generator 4 may be made substantially vertical for the changes in amplitude which occur.

To avoid having to amplify a very high wave, the top portion of it is "cut off" by putting the resistor 14 of high resistance value in series with the grid 6. As soon as the grid 6 becomes positive with respect to the cathode 11, current will tend to flow causing a voltage drop in the resistor 14, and the voltage of the tube is prevented from rising more than a small amount.

Fig. 2 shows this. The curves 22, 23 and 24 represent the curves 15, 16 and 17, respectively, after amplification. The nature of my circuit arrangement prevents the actual rise of the voltages to any such value shown, but the curves will actually be as indicated by reference characters 25, 26 and 27, respectively.

It will be noted that the wave front of curves 25, 26 and 27 is substantially vertical, crossing the critical potential represented by the line 18 at nearly the same point 28. Point 28, obviously has a substantially fixed relation to a given point, as 29, on the voltage waves generated by generator 4, and the position of point 28 is, for all practical purposes, unaffected by the amplitude of the voltage generated.

The tube 20, as has been stated, may be in every respect like tube 8 and the curves shown in Fig. 2 actually represent the voltage output of the tube producing the last stage of amplification. In the arrangement shown, the tube 20 produces the last stage of amplification.

Both tubes 8 and 20 have their cathodes heated from a source of alternating current 31, which source is suitably interconnected with the batteries 10, and 32 and thus does not produce voltage variation on the cathodes of the tubes.

To secure a momentary energization of the electronic device, the connection between tube 20 and electronic device 19 is so made that the capacity of capacitor 33 is small relative to the resistance value of the resistor 34 shunting the input circuit of the device 19. By such a circuit arrangement a sharp peaked impulse, having a definite relation as to position to point 29 is produced.

A short tripping voltage pulse is desirable with gaseous discharge devices such as a grid-glow tube operating as a stroboscope because the grid voltage required to start conduction (fire or breakdown) is quickly removed, thus enabling the discharge tube to more quickly regain its nonconducting state. This results in a sharper light cutoff, as otherwise there is a short-time-after glow which tends to cause a blur. And also if the flashes are close together the tube may not block fast enough to be ready to discharge for the succeeding pulse.

Fig. 3 shows how my circuit arrangement varies the grid potential of device 19 and thus causes device 19 to break down for a brief period, thus producing an illumination represented by a plurality of successive flashes at a frequency equal to rate of vibration of the rotor 1.

Since, for the particular application with which my circuit arrangement is herein shown, the movement of the rotor in a given direction in the plane at right angles to the axis of rotation at the bearing is determined by the position of the unbalance in the rotor, the light impulses of device 19, in conjunction with a pointer or indicating arm adjacent the rotor can be made to indicate on the rotor the location of the unbalance in the rotor.

It will be clear to those skilled in the art that many other variations in detail can be made without departing from the spirit of this invention, and the circumstance that only one embodiment has been illustrated and described is not to be construed as a limitation. What I intend to protect as my invention is indicated in the appended claims.

I claim as my invention:

1. In amplifying circuits, in combination, an input circuit subjected to an alternating-current voltage that is variable in magnitude but substantially constant in frequency, means adapted to amplify said voltage in a plurality of steps and to such an extent that the front of the wave of alternating voltage is substantially vertical, and electronic means adapted to be initiated in operation by a predetermined rise in voltage of the last stage of said amplifier voltage wave, whereby the electronic means is initiated in operation at a substantially fixed time with reference to a selected point on the voltage wave in the input circuit.

2. In amplifying circuits, in combination, an input circuit subjected to an alternating-current voltage that is variable in magnitude but substantially constant in frequency, means adapted to amplify said voltage in a plurality of steps and to such an extent that the front of the wave of alternating voltage is substantially vertical, means adapted to change the amplified voltage to a sharp impulse, and electronic means adapted to be initiated in operation by a predetermined rise in voltage of said voltage impulse, whereby the operation of the electronic means is initiated at a substantially fixed time with reference to a selected point on the voltage wave in the input circuit.

3. In amplifying circuits, in combination, an input circuit subjected to an alternating-current voltage that is variable in magnitude, means adapted to amplify said voltage to such an extent that the front of the waves of alternating-current voltage is substantially vertical, and electronic means adapted to be initiated in operation by a predetermined rise in voltage of said amplified voltage wave, whereby the electronic means is initiated in operation at a substantially fixed time with reference to a selected point on the voltage wave.

4. In amplifying circuits, in combination, an input circuit subjected to an alternating-current voltage that is variable in magnitude, means adapted to amplify the voltage to such an extent that the front of the wave of alternating-current voltage is substantially vertical, means adapted to change the amplified voltage to a sharp impulse, and electronic means adapted to be initiated in operation by a predetermined rise in voltage of said impulse, whereby the electronic means is initiated in operation at a substantially fixed time with reference to a selected point on the voltage wave on the input circuit.

5. In amplifying circuits, in combination, an input circuit, means for supplying said input circuit with an alternating-current voltage that is variable in magnitude, means adapted to amplify the voltage, means adapted to prevent the amplified voltage from rising above a predetermined value, whereby the amplified voltage presents a very steep wave front but small amplitude, and electronic means adapted to be set in operation by a predetermined rise of the amplified voltage.

6. In amplifying circuits, in combination, an input circuit, means for supplying said input circuit with an alternating-current voltage that is variable in magnitude, means adapted to amplify the voltage, means adapted to prevent the amplified voltage from rising above a predetermined value, whereby the amplified voltage presents a very steep wave front but small amplitude, means adapted to change the amplified voltage to a sharp impulse, and electronic means adapted to be set in operation by a predetermined rise of the amplified voltage.

7. In amplifying circuits, in combination, an input circuit, means for supplying said input circuit with an alternating-current voltage that is variable in magnitude, plural means adapted to amplify the voltage by a plurality of steps, means adapted to prevent the amplified voltage from rising above a predetermined value, whereby the amplified voltage presents a very steep wave front but small amplitude, and electronic means initiated in operation by said amplified voltage during the rapid rise of said voltage, whereby the operation of said electronic means begins at a time having a definite relation to a given point on the wave of alternating current supplied to said input circuit.

8. In amplifying circuits, in combination, an input circuit, means for supplying said input circuit with an alternating-current voltage that is variable in magnitude, plural means adapted to amplify the voltage by a plurality of steps, means adapted to prevent the amplified voltage from rising above a predetermined value, whereby the amplified voltage presents a very steep wave front but small amplitude, means adapted to change the voltage produced by the last stage of amplification to an impulse of short duration, said impulse having a definite phase relation to a given point on the wave of the amplified voltage, and electronic means adapted to be energized by said voltage impulse.

9. The combination of a generator of an alternating-current voltage of variable magnitude, an electronic device adapted to produce a radiation for a short interval of time, said electronic device being of the type that is normally deenergized but becomes energized when a potential of a magnitude greater than a predetermined value is impressed thereon, means interposed between the generator and the electronic device for changing the characteristics of the voltage generated by said generator whereby said voltage is converted into a voltage substantially greater than said predetermined value, said substantially greater voltage being manifested at an instant in each period of said alternating current which is independent of the magnitude of said alternating current voltage, and means for impressing said substantially greater voltage on said electronic device, to energize said device at a time having a definite relationship to a given time phase point on the alternating-current voltage wave produced by said generator to thus make the energization of the electronic means substantially independent of variations in magnitude of the voltage produced by said generator.

10. Apparatus according to claim 9 characterized by the fact that the generator produces alternating-current voltage of substantially constant frequency.

LLOYD E. SWEDLUND.